United States Patent [19]

Moore

[11] Patent Number: 5,123,666
[45] Date of Patent: Jun. 23, 1992

[54] HAND TRUCK ATTACHMENT

[76] Inventor: John W. Moore, 305 Lakeside Dr., Edinboro, Pa. 16412

[21] Appl. No.: 593,875

[22] Filed: Oct. 5, 1990

[51] Int. Cl.⁵ .......................... B62B 1/12; B62B 1/14
[52] U.S. Cl. .............................. 280/47.28; 280/47.18; 280/47.19; 414/446
[58] Field of Search ............. 280/47.18, 47.28, 47.29, 280/47.19, 30, 47.23, 47.27; 414/455, 456, 446, 450, 608

[56] References Cited

U.S. PATENT DOCUMENTS

| | | | |
|---|---|---|---|
| 653,826 | 7/1900 | Soule et al. | 208/47.28 |
| 2,516,260 | 7/1950 | Schildmeier | 280/47.28 X |
| 2,721,086 | 10/1955 | Gorley et al. | 280/47.29 |
| 2,778,515 | 1/1957 | Hanson | 280/47.19 X |
| 2,795,433 | 6/1957 | Moriarty | 280/47.28 |
| 2,814,402 | 11/1957 | Schaefer | 280/47.29 X |
| 2,869,886 | 1/1959 | Wardell | 280/47.28 X |
| 3,052,323 | 9/1962 | Hopfeld | 280/47.29 X |
| 3,690,488 | 9/1972 | Cave | 280/47.28 X |
| 3,870,177 | 3/1975 | Cobb | 414/446 |
| 4,521,030 | 6/1985 | Vance | 280/47.29 X |

FOREIGN PATENT DOCUMENTS

| | | | |
|---|---|---|---|
| 72685 | 4/1970 | Fed. Rep. of Germany | 280/47.18 |
| 696854 | 10/1965 | Italy | 280/47.29 |
| 340766 | 10/1959 | Switzerland | 280/47.28 |
| 0640187 | 12/1983 | Switzerland | 280/47.29 |
| 749545 | 5/1956 | United Kingdom | 280/47.29 |
| 894253 | 4/1962 | United Kingdom | 20/47.29 |

Primary Examiner—Andres Kashnikow
Assistant Examiner—Brian L. Johnson
Attorney, Agent, or Firm—John L. Welsh; N. J. Aquilino

[57] ABSTRACT

A attachment for a two-wheeled hand truck cart enabling one person to lift and transport bulky items such as banquet tables and chairs. The attachment includes a rigid base plate with suitable hooks for attaching the plate to the cart frame. Two pair of projecting prong members are adjustably positioned on the rigid base plate. The pairs of prong members are vertically spaced from each other forming a spacing to accommodate items to be lifted.

12 Claims, 4 Drawing Sheets

HAND TRUCK ATTACHMENT

BACKGROUND OF THE INVENTION

The present invention relates to an attachment for a hand truck and in particular to a hand truck attachment for lifting heavy and/or bulky items such as tables and/or chairs.

Hand trucks are commonly used to transport various heavy and bulky items. Most hand trucks are structured with two wheels, a base support and a vertical frame terminating in suitable handles.

In use, the items to be transported are placed on the base support. The hand truck is tilted, allowing the items to lean against the vertical frame when the base support is lifted off of the ground surface. The wheels enable the truck to be pushed or pulled to transport the items. Conventional hand trucks perform quite well for transporting symmetrically shaped articles such as boxes, packing cases and the like. However, it is often difficult to transport bulky items of non-symmetrical shape because such items do not easily fit on the hand truck structure. This problem has been addressed as shown in prior art devices used on hand trucks, such as auxiliary support arms or the like in U.S. Pat. No. 653,826 to Soule et al, U.S. Pat. No. 2,795,433 to Moriarty, U.S. Pat. No. 2,869,886 to Wardell and U.S. Pat. No. 3,690,488 to Cave, among others.

The present invention is a hand truck cart attachment which enables bulky items such as tables and chairs to be transported easily by a single person. The attachment is a plate having two pair of support prongs extending perpendicular from the plate. The plate is provided with mounting hooks to removably engage the support frame of the hand truck cart enabling the attachment to be positional at the top or bottom or midway on the cart structure. When the attachment is in place on the hand truck, the plate lies flat against the vertical frame and the prongs extend horizontally from the frame to provide additional supports on the truck.

The support prongs are capable of being adjustably positioned on the support plate enabling them to be spaced in accordance with the particular load to be carried.

The attachment prongs serve as series of extended finger-like projections and the various sized and shaped articles to be carried is placed within the projections. The hand truck cart is tilted, raising the projections upwardly to engage the load. A lifting force applied to the handle enables the load to be lifted by using the wheels as a fulcrum. The lower set of prongs engages the load to lift it, whereas the upper set of prongs maintains the load in place as it is being lifted.

Among the objects of the present invention are the provision of a hand truck cart attachment to facilitate the transporting of heavy odd-shaped items; the provision of an attachment to facilitate the transporting of tables and chairs by a single person.

DESCRIPTION OF THE PREFERRED EMBODIMENTS

Figure 1:
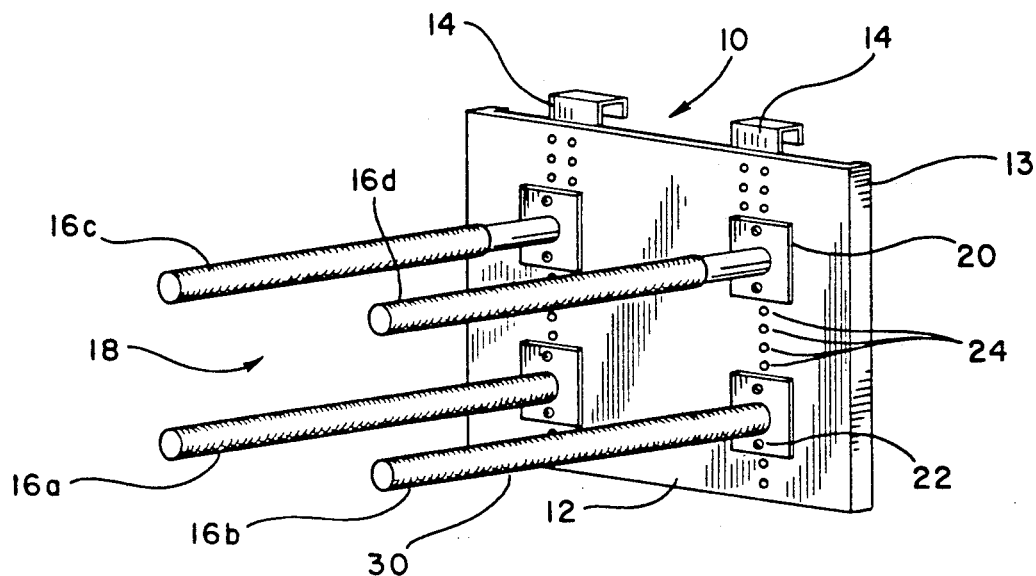
FIG. 1 illustrates a perspective view of the hand truck attachment of the present invention.
Figure 2:
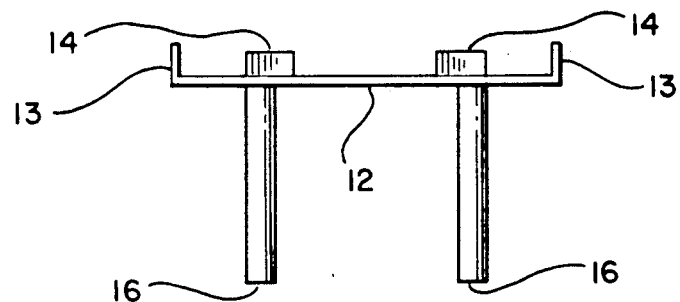
FIG. 2 is a top plan view of the attachment of FIG. 1.
Figure 3:
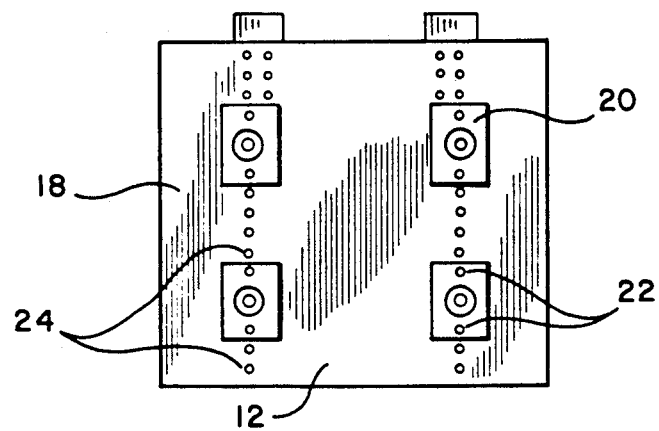
FIG. 3 is a front elevational view of the attachment of FIG. 1.
Figures 4, 5:
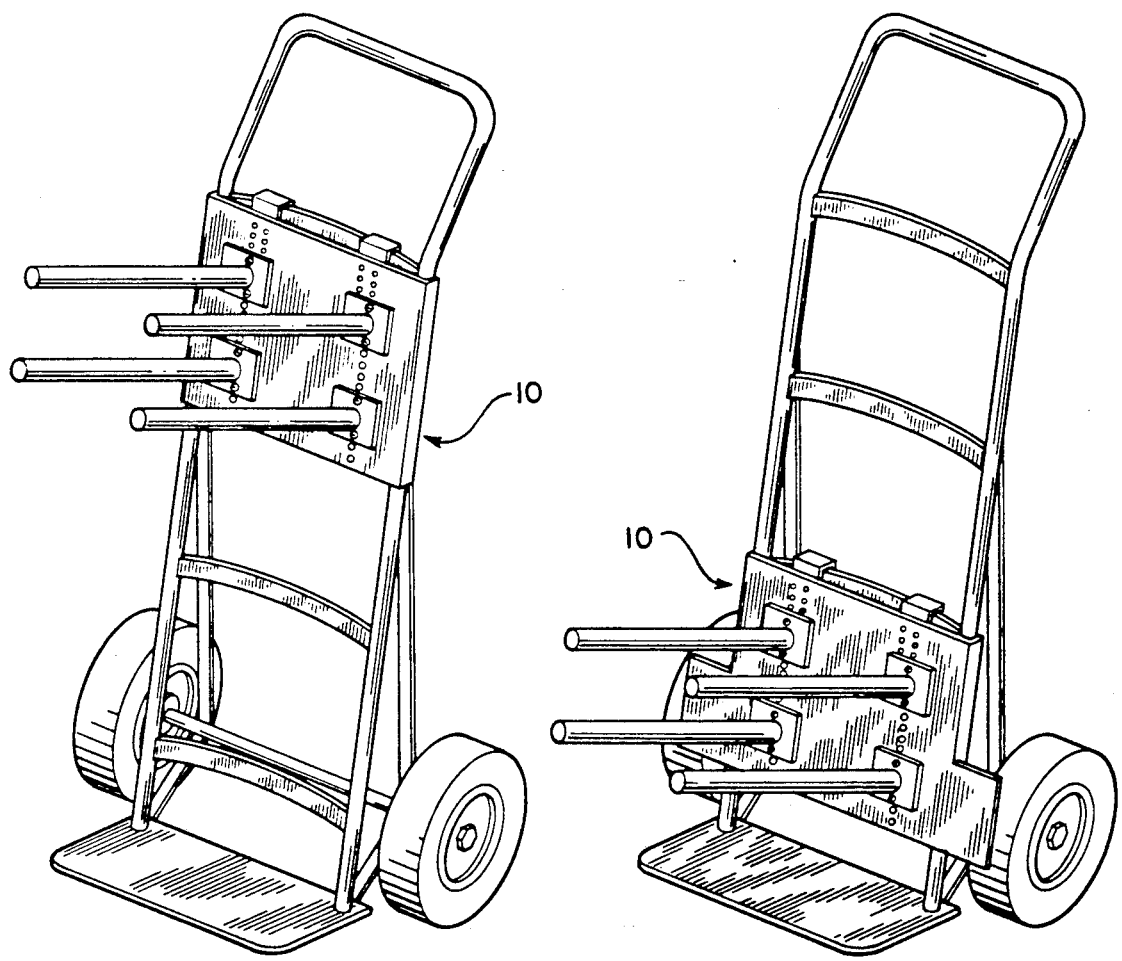
FIG. 4 is a perspective view of the attachment of the present invention attached to the upper frame portion of a hand truck.
FIG. 5 is a perspective view of the attachment of the present invention attached to the lower frame portion of a hand truck.

The hand truck attachment 10 of the present invention is illustrated in the drawings. The attachment 10 is formed of a base support plate 12 which is preferably rectangular in shape and made of rolled steel or a similar rigid, strong material capable of supporting loads up to several hundred pounds. The plate 12 is sized to conform with the dimensions of the vertical frame portion of a hand truck. The plate 12 is supported on the hand truck frame by means of side extensions 13 which cooperate with the vertical frame portions of a hand truck and hook members 14 which are attached to the plate 12 by suitable fasteners, such as nuts and bolts. Preferably the hook members 14 are adjustably positioned on the plate 12 using a series of mounting holes to accommodate its use on various sized hand truck structures.

Two pair of load lifting and transporting prongs 16 are rigidly, but adjustably attached, to the support plate 10. The prongs 16 project outwardly from the support plate and are preferably perpendicular thereto. A lower pair of prongs 16a and 16b are mounted approximate the bottom of the plate 12 while an upper pair of prongs 16c and 16d are mounted approximate the top of the plate 12.

The upper and lower pair of prongs are separated to form an opening 18 which accommodates an article to be lifted and transported as described hereinbelow.

Preferably, the prongs 16 are made of an elongated cylindrical pipe material having a mounting flange 20 attached to one end thereof, such as by welding or the like. The pipe material is covered with a rubber sheath or other similar soft and resilient material 30 to minimize damage to any article being carried. The mounting flange 20 includes mounting holes for fasteners 22, such as nuts and bolts, which cooperate with correspondingly sized bores 24 in the support plate 12.

In order that the prongs 16 can be adjustably positioned on the support plate 12, the series of bores 24 are vertically spaced from each other. It will be appreciated it becomes a relatively simple matter to adjust the opening 18 between the two pairs of vertically spaced prongs 16 by using preselected spaced bores 24.

When the prongs 16 are suitably positioned on the support plate 12, they project outwardly like a set of open fingers to receive the article to be carried. In use on a hand truck, the attachment prongs 16 are pushed, slid or otherwise positioned so the article to be carried is located in the opening 18. When the hand truck is tilted in the manner in which it is normally used, the prongs 16 engage the load article, thereby lifting it off of the ground so that the hand truck and load may be wheeled to another location.

Figure 6:
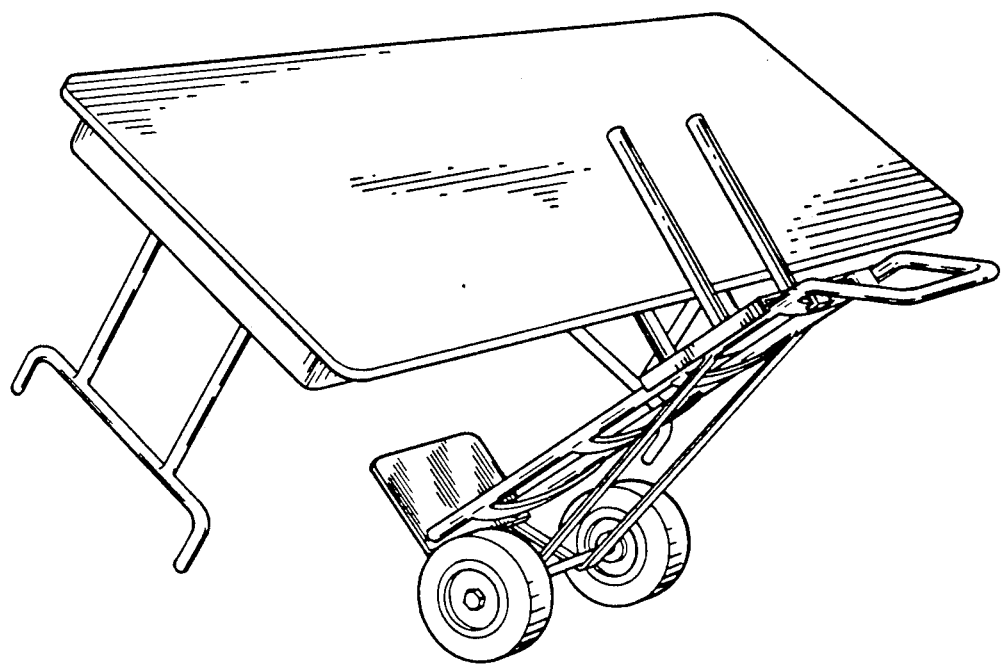
FIG. 6 is a view of the attachment and a hand truck used to transport a table.

The combination of a lower and upper set of prongs 16 permits the lower prongs 16a and 16b to do the lifting, whereas the upper prongs 16c and 16d maintain the article in position while it is being transported. This is particularly useful when transporting bulky articles, such as tables, as shown in FIG. 6, where the center of gravity of the table is located beyond the ends of the prongs 16 such that if it were lifted with only a single pair of prongs, there would be nothing to prevent the table from falling off the hand truck. With the present invention, when the table begins to tilt, it is immediately restrained by the upper set of prongs 16c and 16d to maintain it in position during the transporting procedure.

The adjustment feature for mounting the prongs 16 permits adjusting the opening 18 between the prongs 16 to accommodate specific sized tables or other articles.

Figure 7:
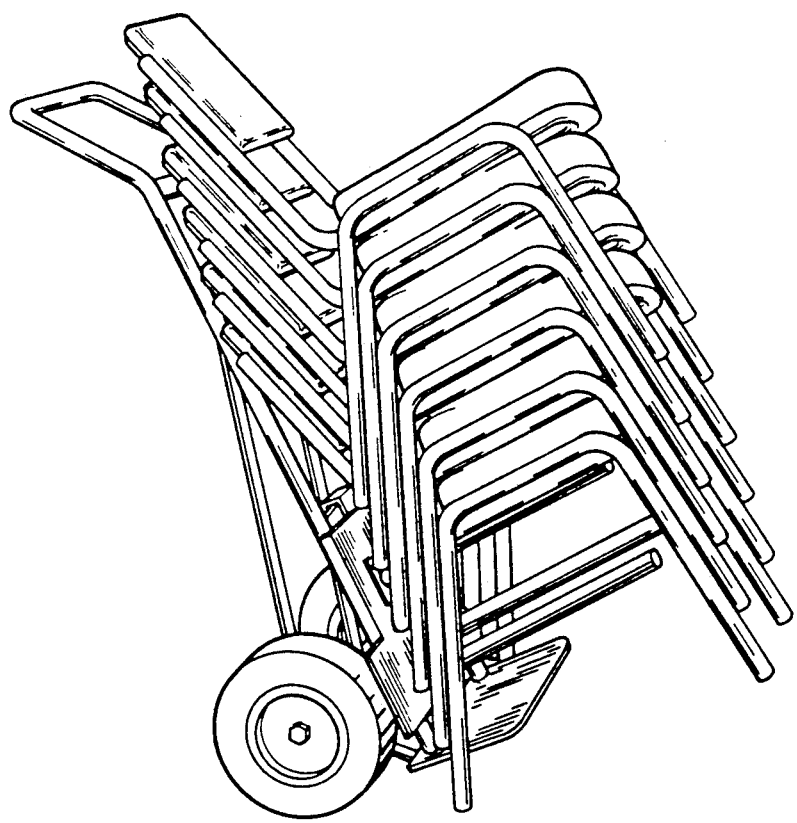
FIG. 7 is a view of the attachment and a hand truck made to transport stacked chairs.
Figure 8:
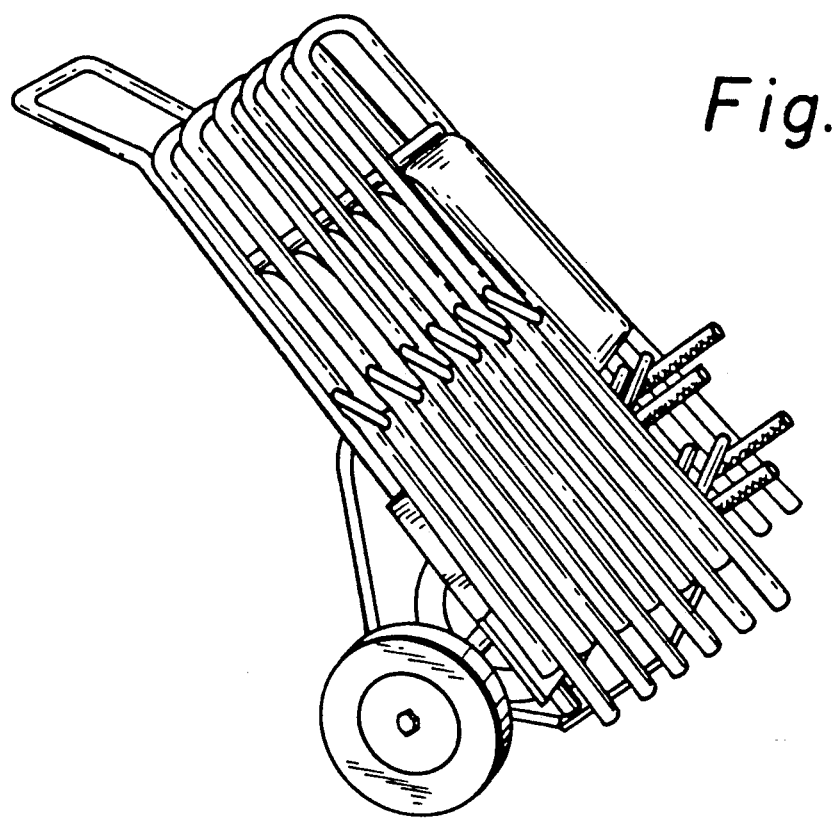
FIG. 8 is a view of the attachment and a hand truck used to transport folded chairs.

FIGS. 7 and 8 further illustrate the attachment of the present invention carrying both stacked and folded chairs. It will be appreciated the chairs cannot be carried without the attachment of the present invention since they would scrape along the floor surface as the hand truck is wheeled.

Figure 9:
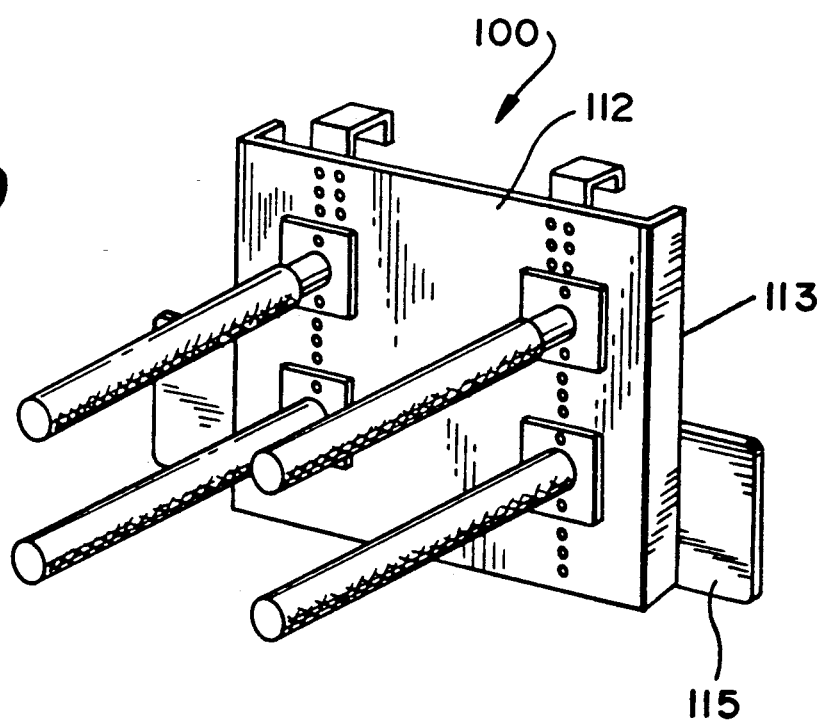
FIG. 9 is a view of a second embodiment of a hand truck attachment of the present invention.

FIG. 9 illustrates a second embodiment of hand truck attachment 100 of the present invention. In this embodiment, the support plate 112 includes side flanges 113 with attached wheel guards 115. This structure is particularly well suited for carrying chairs where the chair legs would normally extend into the hand truck wheels when supported on the hand truck frame structure.

Whereas the attachment of the present invention has been shown and described as being formed of a plurality of separately attached parts, it will be appreciated that the attachment could be made of a single piece of high strength material either permanently formed or welded together as long as the upper and lower pair of load lifting and transporting prongs are provided to lift and stabilize the load. Other modifications or changes may be made in keeping within the scope of the invention as defined in the following claims.

I claim:

1. An attachment for a hand truck having a frame including at least two vertical frame members having a length and at least one crossbar connected between the vertical frame members to facilitate lifting and transporting odd shaped articles, wherein the attachment comprises:
a base support plate having opposing sides and a top and bottom edge;
means for removably connecting said base support plate to a hand truck frame which allows for selective adjustment along the length of the hand truck frame members so as to engage at least one crossbar on the hand truck;
an upper and lower pair of load supporting prongs, each having an upper and lower surface; and
means for adjustably attaching said prongs rigidly to said base support plate such that said upper pair of prongs can support a load from both said upper and lower surfaces and such that said upper pair of prongs are vertically spaced from said lower pair of prongs to form a parallelogram; wherein the rigid attachment and the spacing between said upper and lower prongs allows them to cooperate in order to lift and support an article therebetween.

2. The attachment of claim 1 wherein said base support plate is rigid, generally rectangular and dimensioned so as to engage the vertical frame members of the hand truck.

3. The attachment of claim 1, means for adjustably attaching said prongs to said support plate includes a series of bores vertically spaced on said base support plate, mounting flanges at one end of said prongs and fasteners which cooperate with selected ones of said vertically spaced bores and mounting flanges to connect said prongs to said base support plate.

4. The attachment of claim 1 wherein said means for adjustably attaching said prongs to said base support plate includes a series of bores vertically spaced on said base support plate and fasteners which extend through a selected one of said vertically spaced bores to connect to said prongs.

5. The attachment of claim 4 wherein said prongs further include mounting flanges on one end thereof.

6. The attachment of claim 1 wherein said prongs are perpendicularly disposed to and project outwardly from said base support plate.

7. The attachment of claim 1 wherein said prongs are elongated and cylindrical in shape.

8. The attachment of claim 1 wherein said prongs are pipes covered with a resilient coating.

9. The attachment of claim 1 wherein said base support plate further includes wheel guards attached to the opposing sides of said base support plate approximate the bottom edge of said base support plate to form an auxiliary support.

10. The attachment of claim 1, wherein said means for removably connecting said base support plate further includes generally perpendicular side extensions connected to the sides of said base support plate which cooperate with the vertical frame members of the hand truck.

11. An attachment for a hand truck having a frame including at least two vertical frame members having a length and at least one crossbar connected between the vertical frame members to facilitate lifting and transporting odd shaped articles, wherein the attachment comprises:
a base support plate having opposing sides and a top and bottom edge;
means for removably connecting said base support plate to a hand truck frame which allows for selective adjustment along the length of the hand truck frame members so as to engage at least one crossbar on the hand truck;
said means for removably connecting said base support plate includes at least one hook member adjustably attached to said base support plate to selectively engage a crossbar of the hand truck frame;
an upper and lower pair of load supporting prongs, each having an upper and lower surface; and
means for adjustably attaching said prongs rigidly to said base support plate such that said upper pair of prongs are vertically spaced from said lower pairs of prongs to form a parallelogram; wherein said upper prongs can support a load from both said upper and lower surfaces.

12. An attachment for a hand truck having a frame including at least two vertical frame members having a length and at least one crossbar connected between the vertical frame members to facilitate lifting and transporting odd shaped articles, wherein the attachment comprises:
a base support plate having opposing sides and a top and bottom edge;

means for removably connecting said base support plate to a hand truck frame which allows for selective adjustment along the length of the hand truck frame members so as to engage at least one crossbar one the hand truck.

an upper and lower pair of load supporting prongs, each having an upper and lower surface; and means for adjustably attaching said prongs rigidly to said base support plate such that said upper pair of prongs are vertically spaced from said lower pair of prongs to form a parallelogram; wherein said means for attaching said upper prongs includes a pair of spaced fastener means for attaching said upper prongs to support a load from both said upper and lower surfaces.

* * * * *